(12) United States Patent
Dell'Orto et al.

(10) Patent No.: US 10,678,114 B2
(45) Date of Patent: Jun. 9, 2020

(54) GROUND STRUCTURE IN RF WAVEGUIDE ARRAY

(71) Applicant: Oclaro Technology Limited, Northamptonshire (GB)

(72) Inventors: Flavio Dell'Orto, Desio (IT); Marco Villa, Cabiate (IT)

(73) Assignee: Lumentum Technology UK Limited, Northamptonshire (GB)

(*) Notice: Subject to any disclaimer, the term of this patent is extended or adjusted under 35 U.S.C. 154(b) by 0 days.

(21) Appl. No.: 16/307,231

(22) PCT Filed: Jun. 30, 2017

(86) PCT No.: PCT/GB2017/051934
§ 371 (c)(1),
(2) Date: Dec. 5, 2018

(87) PCT Pub. No.: WO2018/002656
PCT Pub. Date: Jan. 4, 2018

(65) Prior Publication Data
US 2019/0196295 A1 Jun. 27, 2019

(30) Foreign Application Priority Data
Jul. 1, 2016 (GB) ..................................... 1611576

(51) Int. Cl.
*G02F 1/225* (2006.01)
*H01P 3/02* (2006.01)

(52) U.S. Cl.
CPC ............ *G02F 1/2255* (2013.01); *G02F 1/225* (2013.01); *H01P 3/026* (2013.01); *G02F 2201/122* (2013.01)

(58) Field of Classification Search
CPC .. G02B 6/2255; G02F 2201/122; H01P 3/026
See application file for complete search history.

(56) References Cited

U.S. PATENT DOCUMENTS 6,686,808 B1* 2/2004 Sugawara ............... H01P 1/211
333/1
6,845,183 B2* 1/2005 Cheung ................. G02F 1/0356
359/245

(Continued)

FOREIGN PATENT DOCUMENTS

CN 1682144 A 10/2005
CN 201007762 Y 1/2008

(Continued)

OTHER PUBLICATIONS

Intellectual Property Office of the United Kingdom, Patents Act 1977: Search Report under Section 17(5), Application No. GB1611576.8, dated Nov. 10, 2016, 3 Pages.

(Continued)

*Primary Examiner* — Rhonda S Peace
(74) *Attorney, Agent, or Firm* — Harrity & Harrity, LLP (57) ABSTRACT

A radio frequency, RF, waveguide array. The array comprises a substrate and an electrical RF transmission line array. The substrate comprises a plurality of waveguides, each waveguide being elongate in a first direction. The electrical RF transmission line array is located on a face of the substrate and comprises a plurality of signal electrodes and at least two ground electrodes. Portions of the ground electrodes which are relatively distal from the signal electrodes have reduced height in the direction transverse to the substrate to reduce the amount of material required to produce them.

20 Claims, 7 Drawing Sheets

(56) References Cited

U.S. PATENT DOCUMENTS

| | | | |
|---|---|---|---|
| 7,171,063 B2* | 1/2007 | Feke | G02F 1/035 |
| | | | 385/1 |
| 9,250,455 B2 | 2/2016 | Hosokawa et al. | |
| 9,502,744 B2* | 11/2016 | Wu | H01P 3/026 |
| 9,519,200 B2 | 12/2016 | Kataoka et al. | |
| 9,798,164 B2* | 10/2017 | Balsamo | G02F 1/0356 |
| 2002/0146190 A1 | 10/2002 | Doi et al. | |
| 2006/0126988 A1 | 6/2006 | Nakazawa et al. | |
| 2010/0067841 A1 | 3/2010 | Sugiyama et al. | |
| 2010/0329600 A1 | 12/2010 | Sugiyama | |
| 2011/0019956 A1* | 1/2011 | Sugiyama | G02F 1/035 |
| | | | 385/2 |
| 2015/0293427 A1 | 10/2015 | Goi et al. | |
| 2016/0033848 A1 | 2/2016 | Kataoka et al. | |
| 2017/0248804 A1 | 8/2017 | Sugamata | |
| 2018/0017839 A1 | 1/2018 | Hosokawa et al. | |
| 2019/0196295 A1* | 6/2019 | Dell'Orto | G02F 1/225 |
| 2019/0339583 A1* | 11/2019 | Dell'Orto | G02F 1/2255 |

FOREIGN PATENT DOCUMENTS

| | | |
|---|---|---|
| CN | 103226251 A | 7/2013 |
| CN | 105074546 A | 11/2015 |
| CN | 105122124 A | 12/2015 |
| JP | 2000114641 A | 4/2000 |
| JP | 2003322831 A | 11/2003 |
| JP | 2007033894 A | 2/2007 |
| JP | 2009053444 A | 3/2009 |
| JP | 2009205154 A | 9/2009 |
| JP | 2011007972 A | 1/2011 |
| JP | 2011100168 A | 5/2011 |
| JP | 2012-68679 A | 4/2012 |
| JP | 2012098744 A | 5/2012 |
| JP | 2012212028 A | 11/2012 |
| JP | 2014191095 A | 10/2014 |
| JP | 2015073361 A | 4/2015 |
| WO | WO 2014/156684 A1 | 10/2014 |
| WO | 2015151978 A1 | 10/2015 |

OTHER PUBLICATIONS

Patent Cooperation Treaty, International Search Report and Written Opinion of the International Searching Authority, International Patent Application No. No. PCT/GB2017/051934, dated Sep. 25, 2017, 9 Pages.

International Search Report and Written Opinion for the Application No. PCT/GB2017/051936, dated Sep. 20, 2017, 9 pages.

United Kingdom Search Report for the Application No. GB1611574.3, dated Nov. 10, 2016, 4 pages.

* cited by examiner

GROUND STRUCTURE IN RF WAVEGUIDE ARRAY

RELATED APPLICATIONS

This application is a 35 U.S.C. 371 national stage filing of International Application No. PCT/GB2017/051934, filed on Jun. 30, 2017, which claims priority from United Kingdom Application No. GB1611576.8 filed on Jul. 1, 2016. The contents of the aforementioned applications are hereby incorporated by reference in their entireties.

FIELD OF THE INVENTION

The invention relates to components for use in RF optical apparatus. In particular the invention relates to a waveguide array, for example for use in a dual parallel modulator.

BACKGROUND

Figure 1:
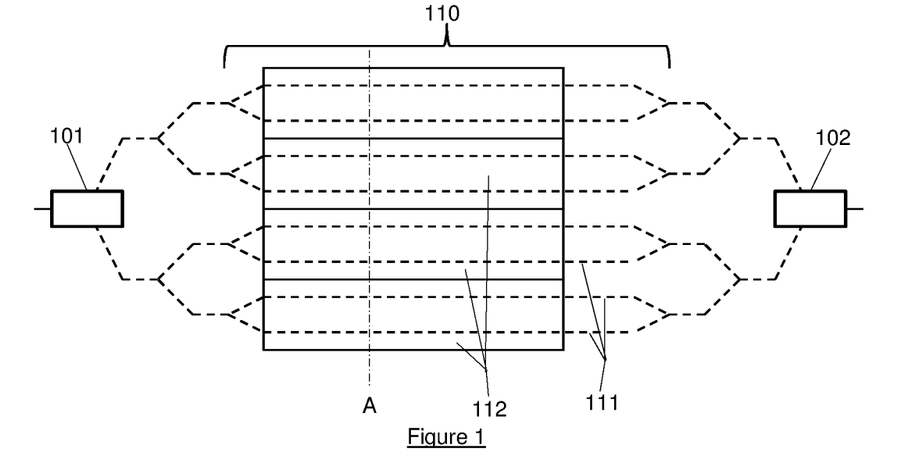
FIG. 1 is a schematic diagram of a dual parallel I/Q (in phase/quadrature) modulator.

A dual parallel I/Q (in phase/quadrature) modulator typically has the structure schematically shown in FIG. 1. The signal enters a splitter 101, which divides the signal into each channel of four Mach-Zehnder modulators 110, each of which comprises two waveguides 111, and an electrical RF (radio frequency) transmission line 112. The modulators apply the required modulation, and the signal is recombined by a combiner 102.

Figure 2:
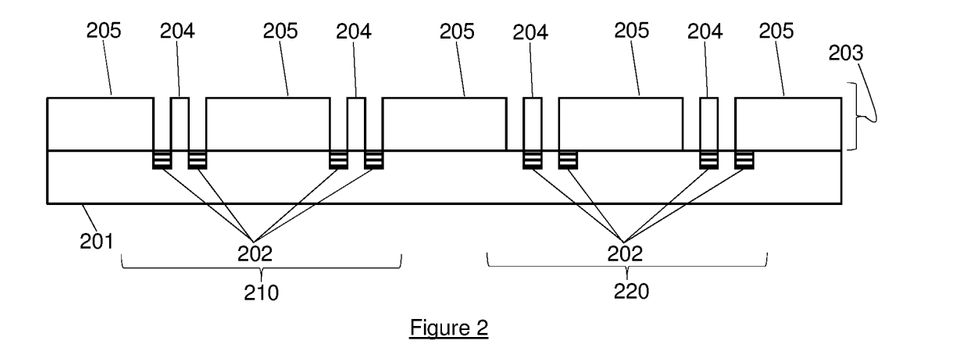
FIG. 2 is a cross section of a waveguide array along the line A in FIG. 1.

The Mach-Zehnder modulator has a cross section along A as shown in FIG. 2. The waveguide section of the Mach-Zehnder modulator comprises a substrate 201, which contains waveguides 202. The RF transmission line array 203 is placed on one face of the substrate. Each RF transmission line comprises a signal electrode 204. Each signal electrode 204 has a ground electrode 205 on either side. The modulators may either be arranged x-cut (210), with the waveguides positioned below the gaps between the signal and ground electrodes (symmetrically around the signal electrode), or z-cut (220) with one waveguide beneath the signal electrode, and one beneath one of the ground electrodes. Normally, all modulators in an array would be the same type, but both z- and x-cut modulators are shown in FIG. 2 for illustration. Intermediate ground electrodes (i.e. those between two signal electrodes) are shared between adjacent RF transmission lines.

SUMMARY

A first aspect of the invention proposes in general terms, that there are a plurality of ground electrodes between each pair of signal electrodes. It has been found that this arrangement improves confinement of the field lines produced by each signal electrode within the RF transmission line. Successive ground lines are separated by a channel.

In particular, the first aspect proposes a radio frequency, RF, waveguide array. The array comprises a substrate and an electrical RF transmission line array. The substrate comprises a plurality of optical waveguides, each waveguide being elongate in a first direction. The electrical RF transmission line array is located on a face of the substrate and comprises a plurality of RF transmission lines. Each transmission line comprises a signal electrode and at least two ground electrodes located on either side of the signal electrode. Each electrode extends in the first direction. Each signal electrode is positioned to provide a signal to two respective waveguides, i.e. each RF transmission line is positioned adjacent to two respective waveguides. The ground electrodes include at least two intermediate ground electrodes positioned between each pair of signal electrodes. Intermediate ground electrodes of different RF transmission lines are separated from each other by channels.

Various arrangements of the ground lines are discussed below.

A second aspect of the invention proposes that the ground electrodes have reduced thickness (that is, height in the direction transverse to the surface of the substrate) in areas which are relatively distant from the signal electrodes. This reduces the amount of the material (typically gold) which is required to produce the ground electrodes, with acceptable (or even no) reduction in the quality of the RF transmission lines. Each ground electrode, which typically has a substantially homogenous chemical composition, may be formed in a single process step which produces the areas of reduced thickness and areas of greater thickness closer to the signal electrodes.

In particular, the second aspect proposes a radio frequency, RF, waveguide array. The array comprises a substrate and an electrical RF transmission line array. The substrate comprises a plurality of optical waveguides, each waveguide being elongate in a first direction. The electrical RF transmission line array is located on a face of the substrate and comprises a plurality of signal electrodes and a plurality of ground electrodes. Each electrode extends in the first direction. Each signal electrode is positioned to provide a signal to two respective waveguides. The ground electrodes include at least one intermediate ground electrode positioned between each pair of signal electrodes. The intermediate ground electrodes have a first height in one or more first regions and a second height in at least one second region, where the height is measured in a direction perpendicular to the face of the substrate. For each intermediate electrode, each first region is closer to a respective signal electrode than the second region. The second height is less than 75% of the first height.

According to a further aspect of the invention, there is provided a dual parallel in-phase/quadrature, I/Q, modulator comprising an RF waveguide array according to either the first or second aspect.

Other embodiments of the invention are set out in claim 2 et seq.

DETAILED DESCRIPTION

"Length" is used herein to refer to distance in the direction of travel of the RF signals in the RF transmission lines—i.e. "out of the page" in FIG. 2.

"Height" is used herein to refer to distance in a direction perpendicular to the face of the substrate to which the RF transmission lines are attached—i.e. vertically in FIG. 2.

"Width" is used to refer to distance in a direction perpendicular to both height and length—i.e. horizontally in FIG. 2, unless otherwise specified.

Figure 3:
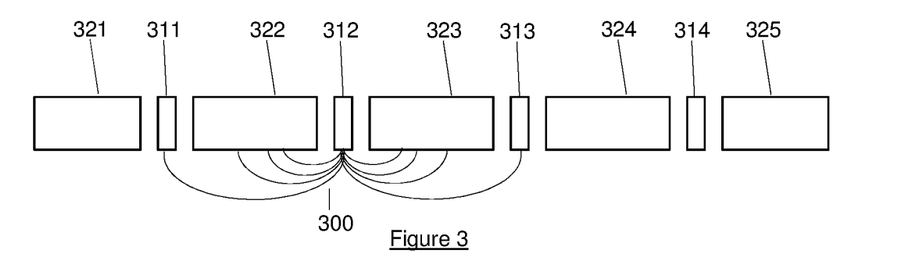
FIG. 3 shows the electric field distribution from a signal electrode in an RF transmission line array of the kind shown in FIG. 1.

FIG. 3 shows the electric field line distribution of the RF transmission line array shown in FIG. 2 (the substrate and waveguides are omitted for clarity). Signal electrodes are labelled 311, 312, 313, 314 from left to right, ground electrodes are labelled 321, 322, 323, 324, 325 from left to right. 321 and 325 are edge ground electrodes, 322, 323 and 324 are intermediate ground electrodes. As can be seen from the field lines 300, the signal from the signal electrode 312 extends through the ground electrodes 322 and 323, and to the nearest other signal electrodes 311 and 313. The wide electrical field distribution gives rise to high frequency losses—even in the case of a single transmission line—and the spread of the field to adjacent lines causes unwanted "crosstalk", i.e. interference on one line caused by another.

Typically, ground electrodes have a width above 100 microns. In the case of a single transmission line, it has been found that the use of narrower ground electrodes in fact improves performance of the transmission line at high frequencies. This is unexpected, as it moves the structure of the transmission line further from the "ideal" case of a coplanar waveguide (where the ground electrodes have infinite width). It is theorised that the improvement is due to tighter confinement of the electrical field.

Figure 4:
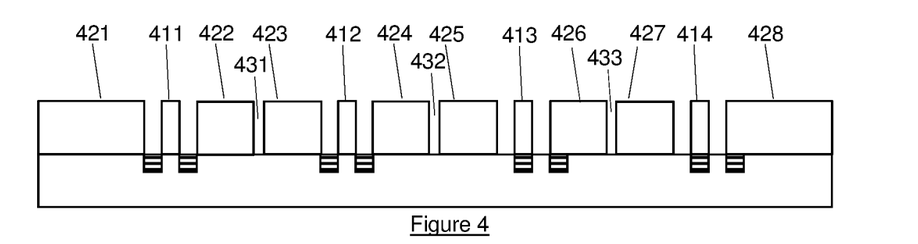
FIG. 4 is a cross section of an exemplary waveguide array.

The current structure of an array of RF transmission lines as shown in FIG. 2 could not use such narrow ground electrodes—if the ground electrodes are below 100 microns in width, then the distance between signal electrodes becomes so small that crosstalk is significant. Instead, we propose splitting each intermediate ground electrode into at least two, as shown in FIG. 4. In FIG. 4, each signal electrode 411, 412, 413, 414 is adjacent to two ground electrodes 421, 422, 423, . . . 428. For example, signal electrode 412 is adjacent to ground electrodes 423 and 424. Intermediate ground electrodes 422, 423, 424, 425, 426, 427 are separated by channels 431, 432, 433. Each of the ground electrodes has a width which is preferably less than 150 microns, and preferably less than or equal to 100 microns. This separation not only provides narrower ground electrodes, improving high frequency performance, but also provides some separation between the RF transmission lines, which reduces crosstalk.

Figure 5:
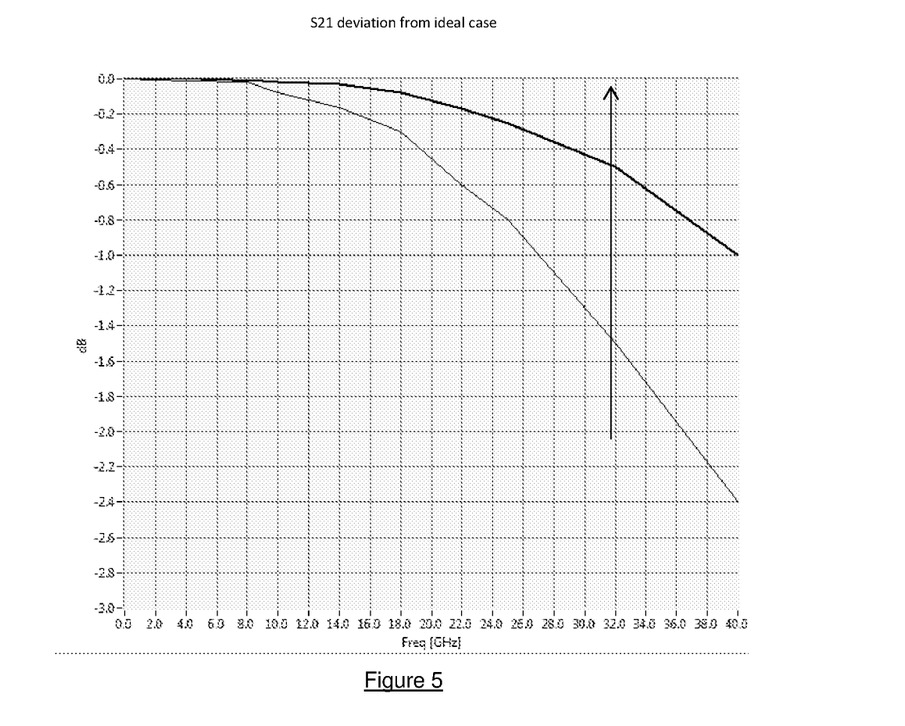
FIG. 5 is a graph comparing the performance of the waveguide arrays of FIGS. 2 and 4.

FIG. 5 shows these improvements—FIG. 5 is a graph of the deviation from the ideal case of the transmission ($S_{21}$) curve of on one of the lines, with the lower curve showing a prior art transmission line array, and the upper curve showing the transmission line array of FIG. 4. At higher frequencies, the transmission parameter $S_{21}$ is closer to the ideal case.

Figure 6:
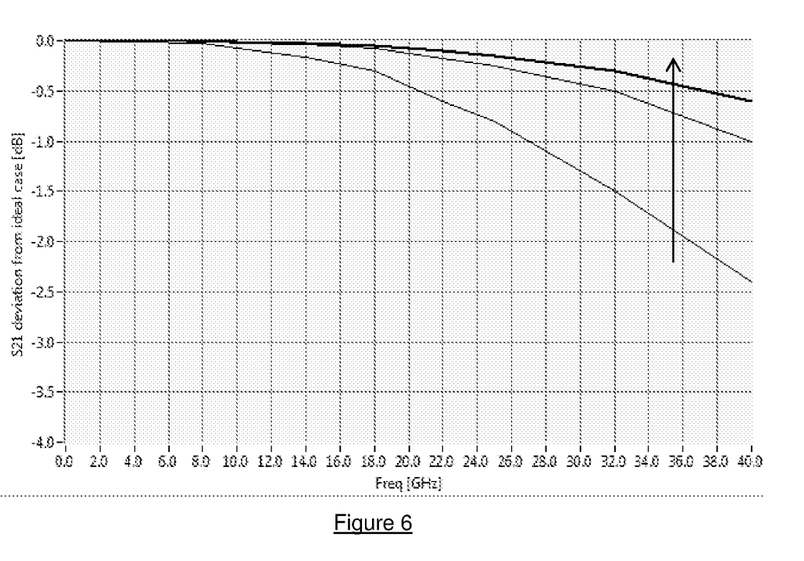
FIG. 6 is a graph comparing the performance of exemplary waveguide arrays.

The improvement in the $S_{21}$ curve continues as the ground electrode becomes narrower—FIG. 6 shows the deviation from an ideal $S_{21}$ curve for RF transmission lines having standard ground electrodes (bottom curve), having ground electrodes ⅓ the width of a standard ground electrode (middle) and having ground electrodes ⅕ the width of a standard ground electrode (top).

Figure 7:
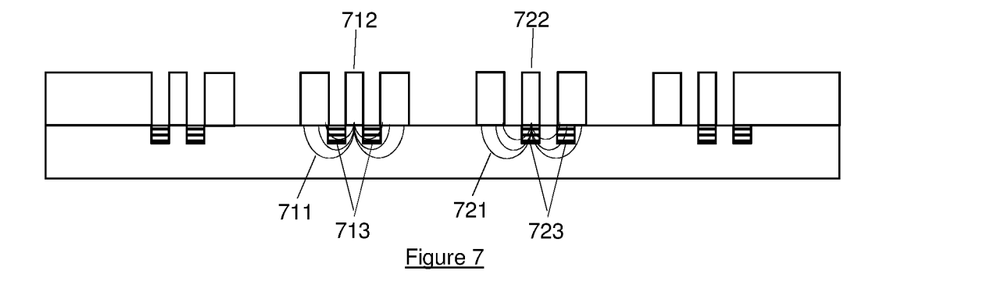
FIG. 7 shows the electric field distribution from a signal electrode in an exemplary waveguide array.

A further advantage of the narrow ground structure is that it improves electro-optical efficiency between the transmission lines and the waveguides. As shown in in FIG. 7, because the electric field 711, 721 from the signal electrodes 712, 722 is more focused, more of the field passes through the waveguides 713 (shown in z-cut) and 723 (shown in x-cut). This benefit is maximised when the width of the ground electrodes is similar to the width of the waveguides—e.g. less than twice the width of the waveguide. The benefit is greatest in the z-cut configuration. In the z-cut configuration, only narrowing of the ground electrode which is above the waveguide provides any benefit to the electro-optic efficiency.

When the ground electrodes are very narrow, there is significant non-smoothness in the $S_{21}$ curve—likely due to the narrow electrodes meaning that any asymmetry causes much larger variations. This effect can be mitigated while retaining the gains in electro-optical efficiency by using a structure such as that shown in FIG. 8. The signal electrode, waveguide, and ground electrodes 810 not above a waveguide in the z-cut case are unchanged. The ground electrodes 800 which are located above a waveguide in the z-cut case, or both the ground electrodes in the x-cut case, each have a plurality of slots 801 in them. The slots are elongate along the length of the ground electrode, and divide the electrode into a region which is above the waveguide, and a region which is not. The region above the waveguide can be made narrow in order to provide improved electro-optic efficiency, and the region not above the waveguide and regions of the ground electrode which do not have slots act to smooth out the $S_{21}$ curve. Although only two slots are shown per ground electrode, there may be any number of slots per ground electrode, preferably all co-linear and extending in the same direction.

The length of the slots may be selected based on a number of constraints. If the slots are too short, then they have no effect on the performance of the modulator. If the slots are too long, then they form cavities in the line which can cause notches on the $S_{21}$ curve. Possible length values are above 50 microns, and below 350 microns. At length values above 350 microns, resonances will become apparent in the $S_{21}$ curve, though for some applications these may be acceptable at higher lengths. For example, the slot may have a length of 80 microns, and the distance between slots may be 40 microns, resulting in a "cell" of 120 microns which is duplicated along the line. The slots may be arranged periodically (that is, all the slots have the same length, and slots are spaced apart from each other pairwise by a certain fixed distance) or non-periodically. Arranging the slots periodically may cause resonances in the line, but these could be compensated for by other means.

Figure 9A:
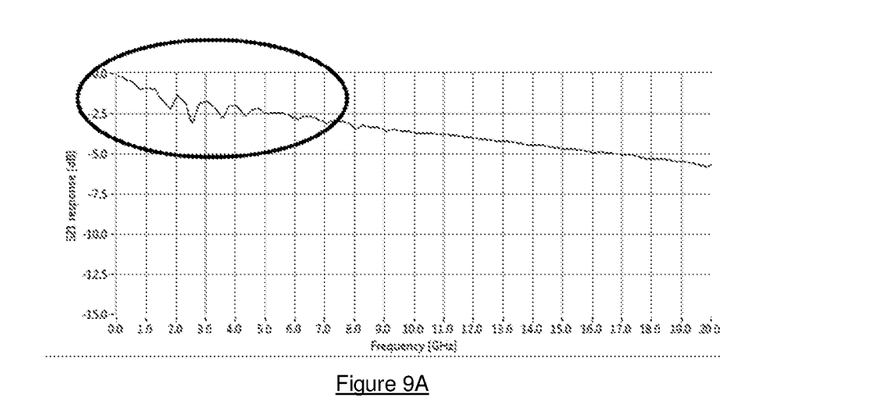
FIG. 9A is a graph showing the performance of an exemplary waveguide array.

FIGS. 9A and B illustrate the low frequency behaviour of a transmission line according to FIG. 4. While the graph on FIG. 5A demonstrated an case where the ground electrodes were connected with a probe station (i.e. electrically isolated from each other), FIG. 9A is a graph showing the case where the ground electrodes are electrically connected at some point at or beyond the start or end of the transmission line (e.g. connected to a common ground, which will generally be the case in a packaged product as the package acts as a ground). As can be seen from the graph, there is a large amount of distortion at low frequency ranges. This is not seen in transmission line arrays without separated ground electrodes, or in single transmission lines with narrow ground electrodes, and its discovery in this case is surprising.

Figure 9B:
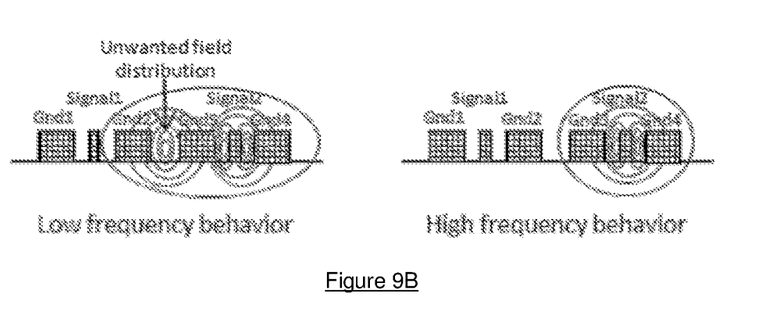
FIG. 9B shows the electric field distribution of an exemplary waveguide array.

This effect appears to occur due to the field distribution shown in FIG. 9B. At low frequencies, a mode emerges with a significant electric field between the intermediate ground electrodes of adjacent transmission lines. This causes coupling between the lines, and the instabilities on the $S_{21}$ curve. At high frequencies, this effect is absent. Therefore, for modulators (or other applications of the transmission line array) which are required to work at low RF frequencies in the transmission line, this mode is undesirable.

We propose, in broad terms, two approaches for removing the undesirable mode. In the first approach, the transmission line array is configured to cause increased losses to the mode compared to the architecture of FIG. 4—the higher the loss of the mode, the lower the frequency at which the mode is significant, so the waveguide can be configured to "push" the mode below the operating frequency of the waveguide. In the second approach, adjacent intermediate ground electrodes are connected in such a way that they act as a single shared electrode at low frequency, and as separated electrodes at high frequency.

An example of the first approach is to narrow the channel between intermediate electrodes. The narrower the channel, the higher the loss of the low frequency mode. This effect becomes significant when the channel is less than 20 microns wide, and the curve is smoother as the channel becomes narrower. However, very narrow channels can have a negative effect due to manufacturing errors causing the intermediate ground electrodes to come into contact. With current technology, this is anticipated to occur for channels less than 5 microns wide, but future improvements in manufacturing may allow for narrower channels. The preferred separation between ground electrodes is 10 microns.

Another example of the first approach is to vary the width of the intermediate ground electrodes along their length. This forces changes in the distribution of the electric field in the channel, which causes the unwanted mode to become very lossy. This can be achieved by varying the width of each intermediate ground electrode independently (i.e. by varying the width of the channel, but ensuring that the intermediate ground electrodes remain separate). Alternatively, this can be done by varying the width of each intermediate ground electrode in a coordinated fashion such that adjacent intermediate ground electrodes interleave with each other. The channel width may be maintained constant, either as measured perpendicular to the length of the electrodes, or perpendicular to the walls of the channel. The minimum width of each ground electrode is preferably greater than or equal to 10 microns but less than 80 microns.

Figure 10:
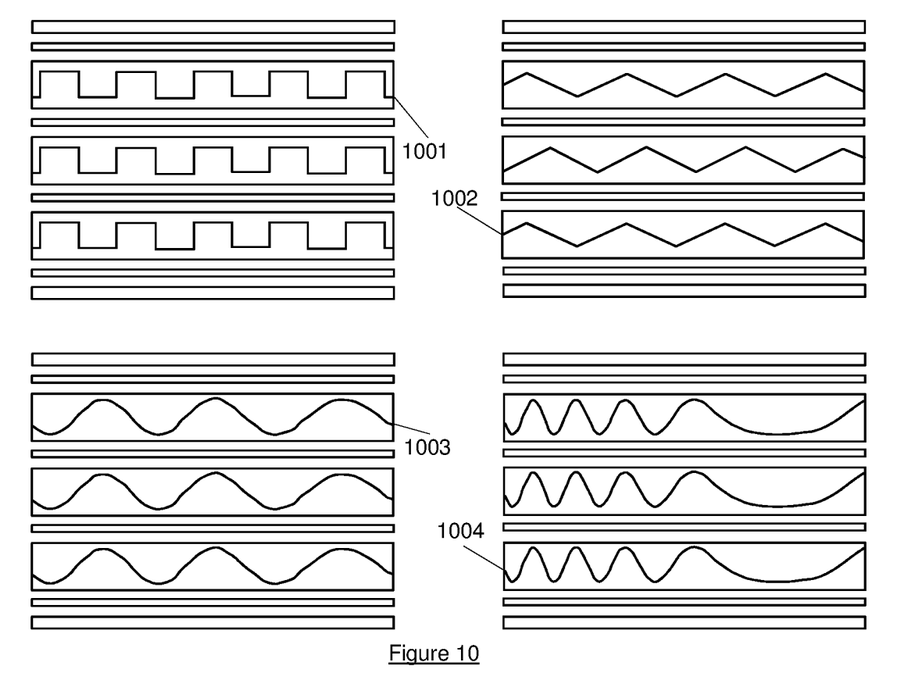
FIG. 10 illustrates exemplary arrangements of ground electrodes for an exemplary waveguide array.

Exemplary structures are shown in FIG. 10. In each of the structures shown the width variation is a "wave-like" formation over the length of the ground electrode, i.e. the width varies repeatedly between a minimum and a maximum width in a periodic or modulated periodic fashion. It will be appreciated that other variations of the width, both wave-like and not wave-like are possible. The structure which shows the greatest benefit is that where the channel forms a "square wave" 1001, i.e. each of the ground electrodes varies according to a square wave along its length, such that the two square waves can interleave without the ground electrodes coming into contact. However, it is anticipated that the "square wave" pattern may be difficult to manufacture, so as an alternative the shape of the channel (and variation in width of the intermediate ground electrodes) may form a triangular wave 1002, a sinusoidal wave 1003, or other varying formation which is a function of the distance along the electrode. Where the width varies by a periodic function, the wavelength of that function may be changed over the length of the electrodes (i.e. modulated), since using a periodic function with constant wavelength may result in resonances and the formation of cavities within the waveguide. An example of this is shown for a sinusoidal wave 1004. Cavities in the waveguide may also be avoided by providing a periodic function with a low wavelength, e.g. less than 600 microns, more preferably less than 500 microns, e.g. 450 microns, more preferably less than 250 microns, e.g. 200 microns.

Where width variation is used, the width may vary between a width less than twice the width of the waveguides and a larger width, in order to provide some of the advantages of narrow waveguides mentioned above with reference to FIG. 7.

Figure 11:
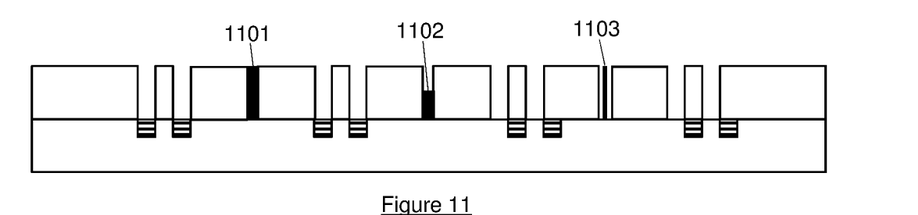
FIG. 11 is a cross section of a yet further exemplary waveguide array.

Yet another example of the first approach, as shown in FIG. 11, is to introduce a material 1101, 1102, 1103 into the channel which causes high RF losses at the frequencies at which the unwanted mode is problematic, e.g. a material with a high absorption, and/or with a high loss tangent (e.g. greater than 0.1), for example a magnetic loaded material. Since only the unwanted mode propagates significantly into the channel, this would favourably cause losses to the unwanted modes. The material may completely fill the channel 1101, or it may only partially fill the channel along its height 1102, width 1103, and/or length. The frequencies at which the losses are required are those where a) the unwanted mode is significant (e.g. less than 10 GHz, or less than 5 GHz) and b) the performance of the waveguide at those frequencies is important (e.g. greater than 0.5 GHz, greater than 1 GHz, or otherwise according to the performance requirements of the application).

Figure 12:
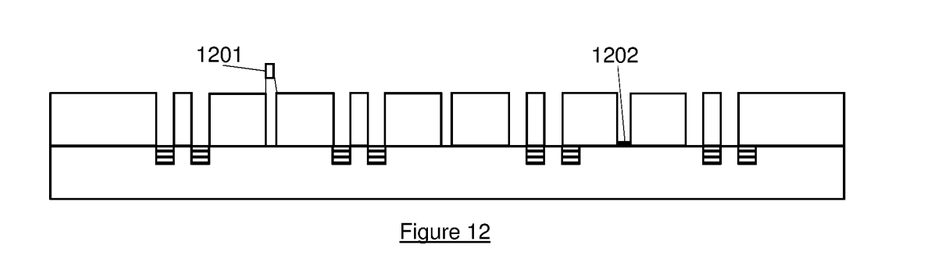
FIG. 12 is a cross section of a yet further exemplary waveguide array.

The second approach, illustrated in FIG. 12 may be achieved by connecting adjacent intermediate ground electrodes with a low pass filter 1201 (shown schematically), or some other structure which acts equivalently to a low pass filter. For example, the adjacent intermediate ground electrodes may be connected by a thin (e.g. less than 1 micron) metal layer 1202 (e.g. formed directly on the substrate), which will cause the intermediate ground electrodes to be effectively connected at low frequencies, and effectively disconnected at high frequencies. This means that the unwanted mode, which only occurs for separate ground electrodes, cannot occur at low frequencies. Since the benefits of separate ground electrodes are only significant at high frequencies (e.g. above 25 GHz), there is little downside to connecting the ground electrodes at low frequency.

Figure 13:
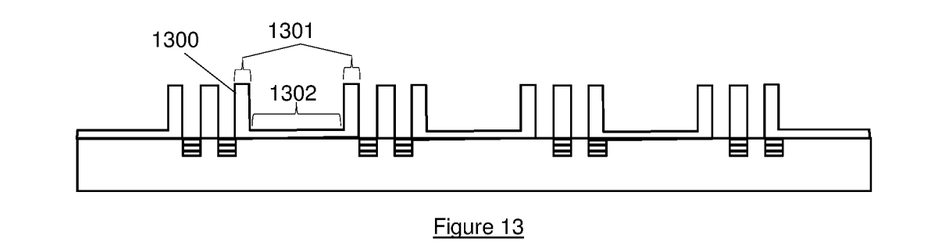
FIG. 13 is a cross section of a yet further exemplary waveguide array.

A further improvement that can be made to RF transmission line arrays is to reduce the amount of gold required. In prior art RF transmission lines, the ground electrodes have the same height as the signal electrodes. However, the behaviour of the transmission line is mostly governed by the regions of the ground electrodes closest to the signal electrodes. As such, a ground electrode structure as shown in FIG. 13 can be used to reduce the amount of gold required. Each ground electrode 1300 has first regions 1301 close to the respective signal electrodes which are the same height as the signal electrodes, and a second region 1302 further from the signal electrode which is a reduced height. In this way, the amount of gold needed to form the ground electrodes can be significantly reduced. The reduced height may be 75% of the height of the signal electrodes, or less, for example less than 50%, 25%, 10% or 5% of the height of the signal electrodes, or less than 10 microns, 5 microns, 2 microns, or 1 micron. The ground electrodes may have a U-shaped profile.

Figure 8:
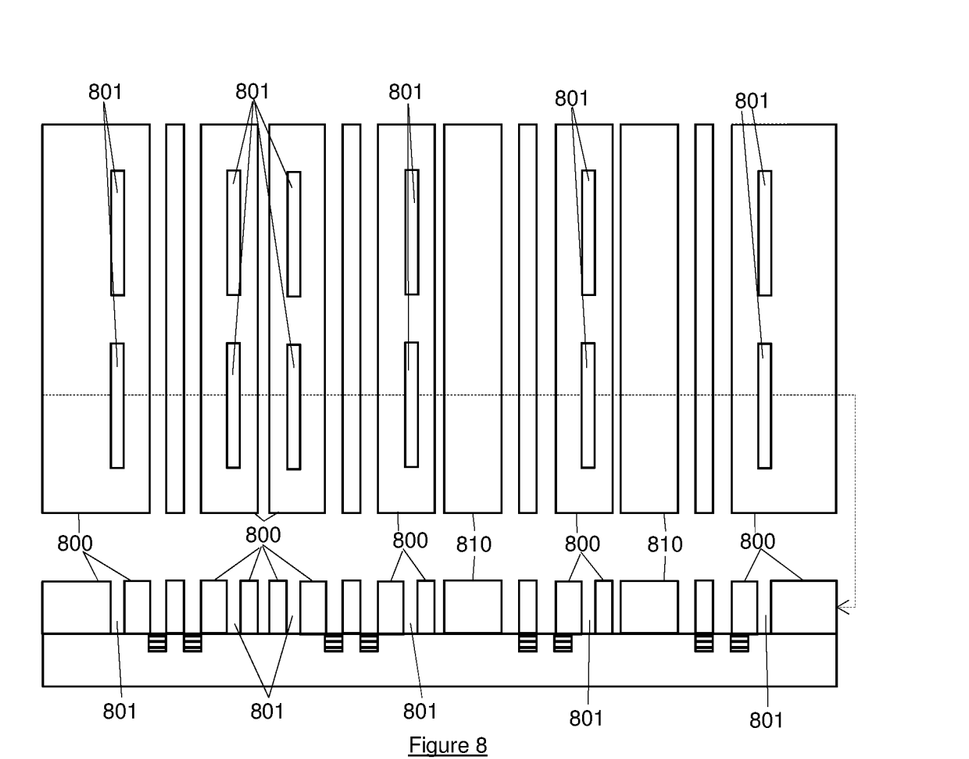
FIG. 8 shows plan and cross sectional views of a further exemplary waveguide array.

Any of the above improvements can be combined—for example:

- Use of both a narrow channel and varying width ground electrodes can be implemented to further suppress the unwanted mode at low frequencies.
- The "slots" in the intermediate ground electrodes presented in FIG. 8 can be combined with ground electrodes of varying width. This can be done either by providing the slots within the minimum width of the ground electrodes, or within the region of the ground electrodes between the minimum and maximum widths.
- The reduced height ground electrodes can be implemented in structures with separated intermediate ground electrodes.

Figure 14:
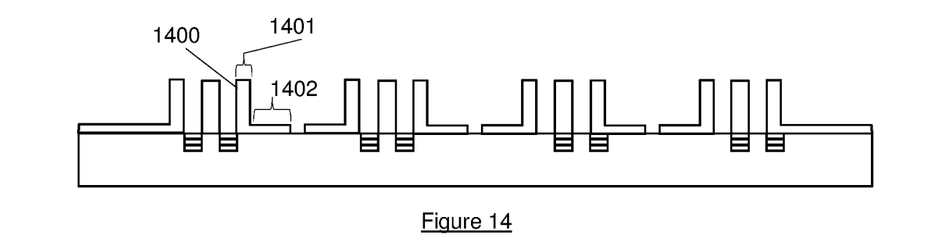
FIG. 14 is a cross section of a yet further exemplary waveguide array.

The last point is illustrated in FIG. 14. Intermediate ground electrodes 1400 may be provided with a first region 1301 having the same height as a signal electrode, and a second region 1302 having a reduced height, where the first region is further from the signal electrode. As an example, each intermediate ground electrode may have an L-shaped profile. Reducing the height of the ground electrodes in these embodiments also helps reduce the risk of shorts in the channel—where the height of the ground electrodes adjacent to the channel is similar to or less than the width of the channel, the channel is easier to manufacture without shorts.

The reduced height may be less than 75% of the height of the signal electrodes, more preferably less than 50%, more preferably less than 10%, more preferably less than 3%. In microns, the reduced height may be less than or equal to 5 microns, more preferably less than or equal to 3 microns, more preferably less than or equal to 1.5 microns.

Figure 15:
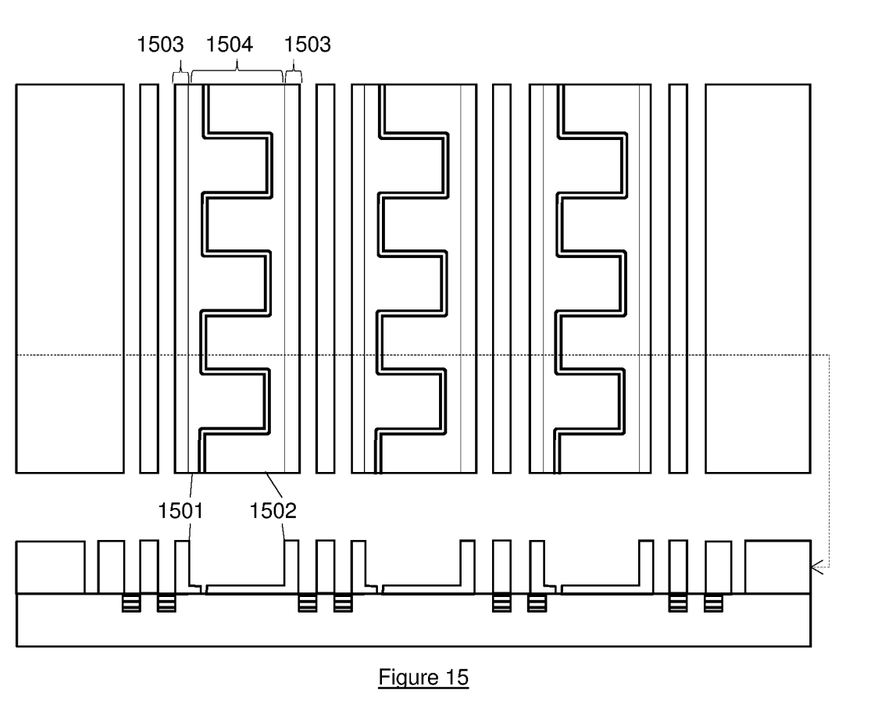
FIG. 15 is a plan view and cross section of a yet further exemplary waveguide array.

This provides a further advantage when the width of the ground electrodes varies along their length—such variation is simpler to manufacture in the reduced height portions of the ground electrodes than for ground electrodes which are the same height as the signal electrode throughout. Therefore, it is proposed that the variation in width occurs entirely within the second region, or equivalently, that the first region is entirely within the minimum width of the ground electrodes. An example is shown in FIG. 15, where intermediate ground electrodes 1501, 1502 each have a height equivalent to the signal electrode in a first region 1503, and a reduced height in a second region 1504. Each intermediate ground electrode 1501, 1502 varies in width, with the variation occurring within the second region 1504.

It should be noted that any design for a waveguide array according to the above examples will be a trade-off of various factors, and the performance required will depend on the application. Therefore, a feature being described as advantageous does not mean that that feature is required—in many applications, there will be sufficient tolerances that some crosstalk or non-smoothness in the $S_{21}$ curve is acceptable, so a less preferred example may be used.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A radio frequency, (RF) waveguide array, comprising:
a substrate comprising a plurality of optical waveguides, each waveguide of the plurality of optical waveguides being elongated in a first direction;
an electrical RF transmission line array located on a face of the substrate, comprising:
a plurality of signal electrodes; and
a plurality of ground electrodes;
wherein:
each electrode, of the plurality of signal electrodes and the plurality of ground electrodes, extends in the first direction;
each signal electrode is positioned to provide a signal to two respective optical waveguides of the plurality of optical waveguides;
the plurality of ground electrodes include an intermediate ground electrode positioned between each pair of signal electrodes;
the intermediate ground electrode has a first height in one or more first regions and a second height in one or more second regions,
the first height and the second height being measured in a second direction perpendicular to the face of the substrate,
the second height being less than 75% of the first height,
the one or more first regions being closer to a respective signal electrode than the one or more second regions, and
the one or more second regions having a non-uniform width in a third direction perpendicular to the first direction and parallel to the face of the substrate; and
the intermediate ground electrode has a U-shaped cross section perpendicular to the first direction.

2. The RF waveguide array of claim 1, wherein the second height is less than or equal to 5 microns.

3. The RF waveguide array of claim 1, wherein the second height is less than 10% of the first height.

4. The RF waveguide array of claim 1, wherein the second height is less than 3% of the first height.

5. The RF waveguide array of claim 1, wherein the first height is at least equal to a height of at least one of the signal electrodes.

6. A dual parallel in-phase/quadrature, (I/Q) modulator comprising the RF waveguide array of claim 1, wherein the plurality of optical waveguides are configured to form a Mach-Zehnder modulator.

7. A radio frequency, (RF) waveguide array, comprising:
a substrate comprising a plurality of optical waveguides, each waveguide of the plurality of optical waveguides being elongated in a first direction;
an electrical RF transmission line array located on a face of the substrate, comprising:
a plurality of signal electrodes; and
a plurality of ground electrodes;
wherein:

each electrode, of the plurality of signal electrodes and the plurality of ground electrodes, extends in the first direction;

each signal electrode is positioned to provide a signal to two respective optical waveguides of the plurality of optical waveguides;

the plurality of ground electrodes include two or more intermediate ground electrodes positioned between each pair of signal electrodes and separated by one or more channels;

each of the two or more intermediate ground electrodes has a first height for a first region and a second height for a second region that extends to one of the one or more channels, the first height and the second height being measured in a second direction perpendicular to the face of the substrate, the second height being less than 75% of the first height, the first region being closer to a respective signal electrode than the second region, and the second region having a non-uniform width in a third direction perpendicular to the first direction and parallel to the face of the substrate; and each of the two or more intermediate ground electrodes has a L-shaped cross section perpendicular to the first direction.

8. The RF waveguide array of claim 7, wherein the two or more intermediate ground electrodes are adjacent and have interleaving profiles.

9. The RF waveguide array of claim 7, wherein the non-uniform width of the second region varies along its length in a wave-like formation.

10. The RF waveguide array of claim 7, wherein the non-uniform width of the second region varies along its length by one of:
a square wave formation;
a sinusoidal wave formation; or
a triangular wave formation.

11. The RF waveguide array of claim 10, wherein a wavelength of the square wave formation, the sinusoidal wave formation, or the triangular wave formation varies along the first direction.

12. The RF waveguide array of claim 7, wherein each first region has a width less than or equal to a minimum width of a respective intermediate ground electrode.

13. The RF waveguide array of claim 7, wherein each channel of the one or more channels is between 5 and 20 microns wide.

14. The RF waveguide array of claim 7, wherein the second height is less than or equal to a minimum width of the one or more channels.

15. The RF waveguide array of claim 7, wherein the second height is less than or equal to 5 microns.

16. The RF waveguide array of claim 7, wherein the second height is less than 10% of the first height.

17. The RF waveguide array of claim 7, wherein the second height is less than 3% of the first height.

18. The RF waveguide array of claim 7, wherein the first height is at least equal to a height of the plurality of signal electrodes.

19. A dual parallel in-phase/quadrature, (I/Q) modulator comprising the RF waveguide array of claim 7, wherein the plurality of optical waveguides are configured to form a Mach-Zehnder modulator.

20. The RF waveguide array of claim 7, wherein each of the channels includes a low pass filter.

* * * * *

UNITED STATES PATENT AND TRADEMARK OFFICE
CERTIFICATE OF CORRECTION

PATENT NO. : 10,678,114 B2
APPLICATION NO. : 16/307231
DATED : June 9, 2020
INVENTOR(S) : Flavio Dell'Orto et al.

It is certified that error appears in the above-identified patent and that said Letters Patent is hereby corrected as shown below:

In the Claims

In Claim 1, Column 8, Line 10, "A radio frequency, (RF) waveguide" should be changed to --A radio frequency (RF) waveguide--;

In Claim 6, Column 8, Line 54, "in-phase/quadrature, (I/O) modulator" should be changed to --in-phase/quadrature (I/Q) modulator--;

In Claim 7, Column 8, Line 58, "A radio frequency, (RF) waveguide" should be changed to --A radio frequency (RF) waveguide--;

In Claim 19, Column 10, Line 29, "in-phase/quadrature, (I/O) modulator" should be changed to --in-phase/quadrature (I/Q) modulator--.

Signed and Sealed this
Twenty-fourth Day of November, 2020

Andrei Iancu
*Director of the United States Patent and Trademark Office*